July 19, 1955 P. B. HOWELL 2,713,394
TRACTOR WHEEL AND AXLE ATTACHED TRACTION DEVICE
Filed Aug. 2, 1954 2 Sheets-Sheet 1
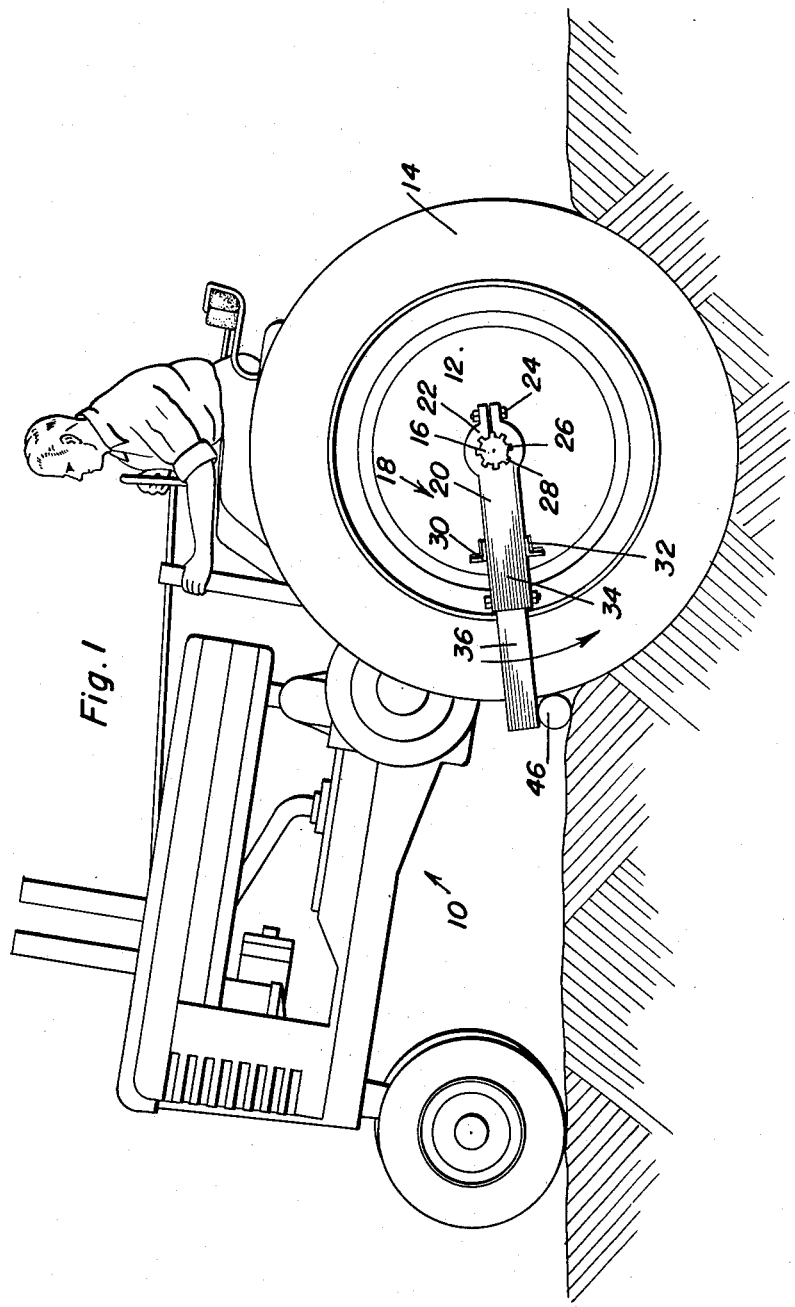
Paul B. Howell
INVENTOR.

July 19, 1955 P. B. HOWELL 2,713,394
TRACTOR WHEEL AND AXLE ATTACHED TRACTION DEVICE
Filed Aug. 2, 1954 2 Sheets-Sheet 2
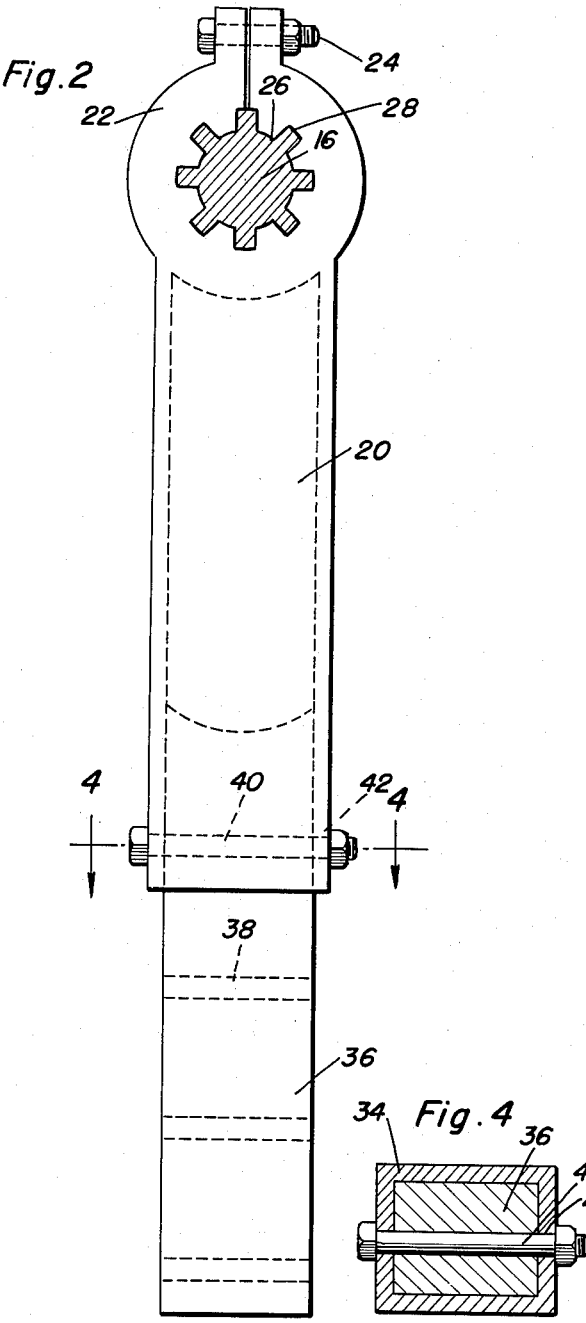
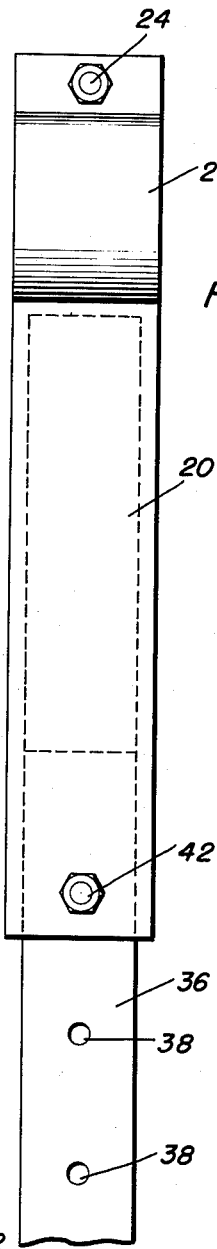
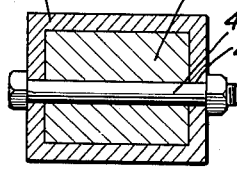
Paul B. Howell
INVENTOR.

United States Patent Office 2,713,394
Patented July 19, 1955

2,713,394

TRACTOR WHEEL AND AXLE ATTACHED TRACTION DEVICE

Paul B. Howell, Northport, Ala.

Application August 2, 1954, Serial No. 447,070

1 Claim. (Cl. 180—7)

This invention relates to an attachment for a vehicle, and more particularly to a traction device adapted for use in association with the wheel and axle of a tractor.

The primary object of this invention resides in the provision of means for extracting a rubber tired tractor out of a mud hole or like difficulty wherein the wheels and tires of the tractor cannot provide sufficient traction, but spin aimlessly through the mud, sand or the like, whereby additional traction can be provided with the simple addition of a pole, log, or other supports, and which device may remain affixed to the tractor wheel and axle when not in use in a telescoped position.

A further object of the invention resides in the provision of a traction device which is permanently installed on the wheel and axle of a tractor and which has a lug telescopingly received and adapted to be extended for providing the additional traction when it is necessary to provide additional traction.

Still further objects of this invention reside in the provision of a tractor device that is strong and durable, simple in construction and manufacture, which is designed for installation on various makes and models of tractors and other suitable vehicles, which is unobtrusive in appearance and which is relatively inexpensive to manufacture, thereby permitting wide distribution and utilization.

These, together with the various ancillary objects and features of the invention which will become apparent as the following description proceeds, are attained by this traction device, a preferred embodiment of which has been illustrated in the accompanying drawings, by way of example only, wherein:

Figure 1 is a side elevational view illustrating the manner in which the invention is installed on a tractor;

Figure 2 is a sectional view of a portion of the axle of the tractor shown with the invention installed thereon;

Figure 3 is a plan view of the tractor device; and

Figure 4 is a sectional detail view as taken along the plane of line 4—4 in Figure 2.

With continuing reference to the accompanying drawings wherein like reference numerals designate similar parts throughout the various views, reference numeral 10 generally designates a tractor of conventional construction which is provided with a wheel 12 having a tire 14 mounted thereon, the wheel 12 being mounted on an axle 16. The tire 14, which is of conventional construction, is often unable to provide sufficient traction for raising and moving the tractor 10 out of a mud hole or the like. Therefore, the traction device 18 comprising the present invention may be readily installed on the wheel 12 and axle 16 of the tractor. This traction device 18 includes a clamp member 20 which has a bifurcated or split portion 22 through which a bolt 24 extends to lockingly secure the clamp member 20 on the axle 16. The axle 16 may be provided with projecting teeth, as at 26, and suitable recesses 28 which correspond to the teeth 26 may be provided in the clamp member 20 to prevent relative rotation of the axle 16 and the clamp member 20 when the traction device 18 is installed thereon.

The wheel 12 is provided with a pair of guides 30 and 32 preferably formed from a pair of angle-shaped members and which are spaced from each other a sufficient distance so as to receive the tubular portion 34 of the clamp member 20 therein. This tubular portion is preferably rectangular in cross-section and telescopingly slidingly receives the inner portion of a lug 36 which is also rectangular in transverse cross-section. The lug 36 is provided with a series of apertures 38 therethrough which are suitably spaced from each other along the length of the lug 36, and a pin or bolt 40 is adapted to be inserted in the apertures or holes 38 through an aperture 42 formed in the tubular portion 34 of the clamp member 20.

In use, when the tractor is operating normally, the lug 36 may be slid all the way into the tubular member 20 and the traction device 18 therefore serves no function, but is carried unobtrusively by the axle 16 and the guides 30 and 32. However, should the tractor become caught in a mud hole or the like, it is a simple matter to release the bolt or pin 40 and extend the lug 36 to a position where it extends beyond the outer periphery of the tire 14. Then, placing a log, such as at 46, or the like, on the ground adjacent the tire 14, the wheel 12 may be rotated until the lug 36 abuts against the log or pole 46 so as to raise the rear wheels of the tractor free of the mud hole by providing sufficient traction.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A traction device for use in conjunction with a tractor wheel mounted on an axle comprising a clamp member adapted to be secured on the axle, a lug member telescopingly secured to said clamp member, said clamp member having a tubular section provided with a transverse aperture therethrough, a pair of spaced guides secured to said wheel and supporting said tubular section therebetween, said lug member being provided with a series of spaced holes therein, and a pin extending through said aperture and a selected one of said holes, said tubular section and said lug being substantially rectangular in cross-section.

References Cited in the file of this patent

UNITED STATES PATENTS

| | | |
|---|---|---|
| 1,199,677 | Edwards | Sept. 26, 1916 |
| 1,301,266 | Holcomb | Apr. 22, 1919 |
| 1,395,111 | Hollifield | Oct. 25, 1921 |
| 2,200,791 | Frisbie | May 14, 1940 |